(12) United States Patent
Shäfer et al.

(10) Patent No.: US 6,455,970 B1
(45) Date of Patent: Sep. 24, 2002

(54) MULTI-PHASE TRANSVERSE FLUX MACHINE

(75) Inventors: Uwe Shäfer, Berlin (DE); Harald Neudorfer, Traiskirchen (AT)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/646,577

(22) PCT Filed: Mar. 16, 1999

(86) PCT No.: PCT/EP99/01711

§ 371 (c)(1),
(2), (4) Date: Sep. 19, 2000

(87) PCT Pub. No.: WO99/48190

PCT Pub. Date: Sep. 23, 1999

(30) Foreign Application Priority Data

Mar. 19, 1998 (DE) .......................................... 198 13 155

(51) Int. Cl.[7] ...................... H02K 21/12; H02K 41/025
(52) U.S. Cl. ................. 310/179; 310/156.02; 310/162; 310/13
(58) Field of Search ............................ 310/12, 13, 14, 310/254, 266, 179, 162, 156.02

(56) References Cited

U.S. PATENT DOCUMENTS

| | | | |
|---|---|---|---|
| 4,255,680 A | | 3/1981 | Popov et al. .................. 310/13 |
| 4,439,698 A | * | 3/1984 | Chen ............................ 310/12 |
| 5,633,551 A | * | 5/1997 | Weh ............................ 310/266 |

FOREIGN PATENT DOCUMENTS

| | | |
|---|---|---|
| DE | 31 22 695 A1 | 6/1981 |
| DE | 196 14 862 A | 11/1997 |
| WO | WO 97/39515 | 10/1997 |

OTHER PUBLICATIONS

Lansen, et al: "Analysis of Competing Topologies of Linear Induction Machines for High Speed Material Transport Systems"; 1993 IEEE Industry Applications Conference 28th Annual Meeting, No. 1, Aug. 3–8, 1993, pp. 274–281, XP000427451, Toronto, Canada.

* cited by examiner

*Primary Examiner*—Nestor Ramirez
*Assistant Examiner*—Judson H. Jones
(74) *Attorney, Agent, or Firm*—Venable; Norman N. Kunitz

(57) ABSTRACT

Described herein is a multi-phase transverse flux machine, which comprises a stator with essentially U-shaped and I-shaped cores (1, 2) of a soft-magnetic material and respectively one stator winding (3) for each phase that generates a magnetic flux in these cores, as well as a rotor with circular magnetic return path (4). The phases of the stator are magnetically separated. The rotor contains electrically conductive material (5, 6) in each of the phases, wherein the electrically conductive material of at least two phases is arranged and is interconnected in the rotor, such that if an alternating current flows through the stator windings of these phases, a current generating a starting torque for the rotor is induced in the electrically conductive material. The at least two phases thus electrically form a rotating magnetic field machine in the rotor. The rotating magnetic field can be generated in that the stator windings of the at least two phases are admitted with currents that are phase-displaced relative to each other. However, it is also possible for the electrically connected rotor poles of the at least two phases and/or the stator poles assigned to these phases to be geometrically displaced relative to each other. The transverse flux machine thus exhibits the operational behavior of an asynchronous machine, so that it can be operated without permanent magnets.

11 Claims, 3 Drawing Sheets

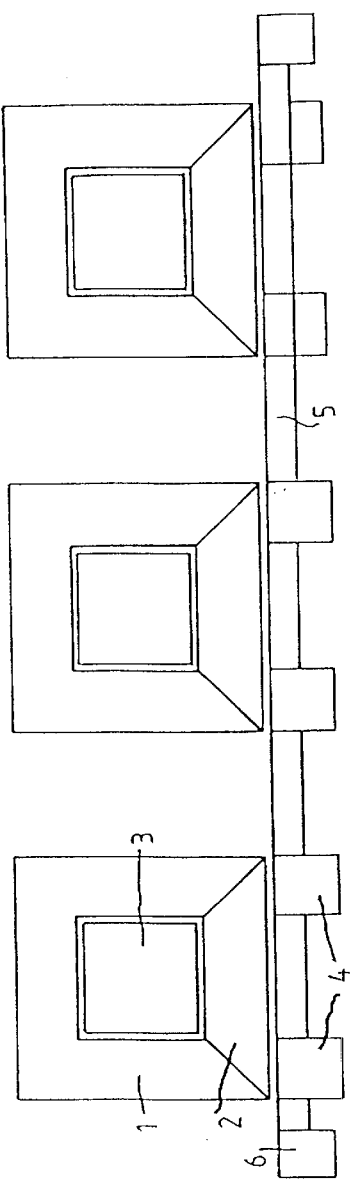
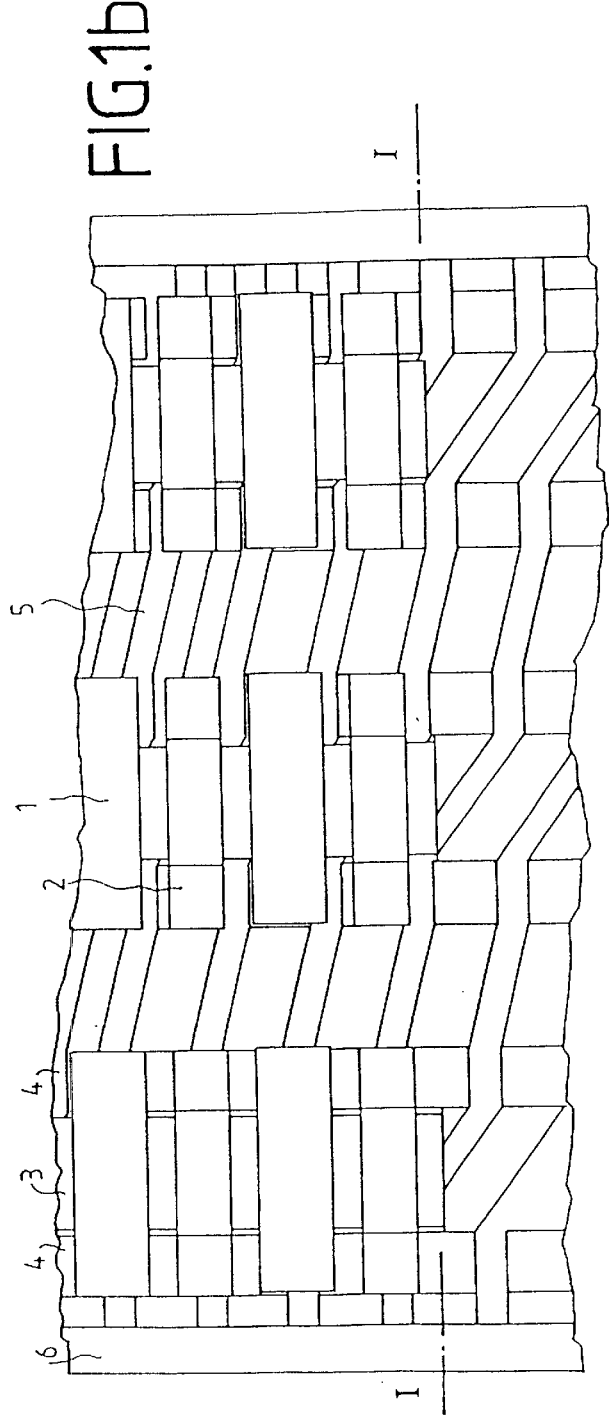

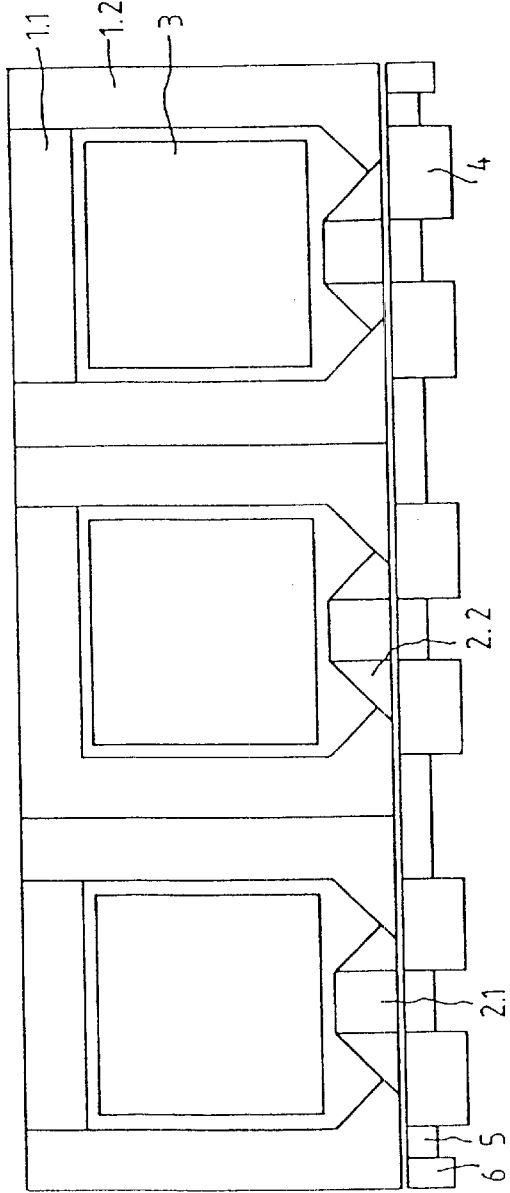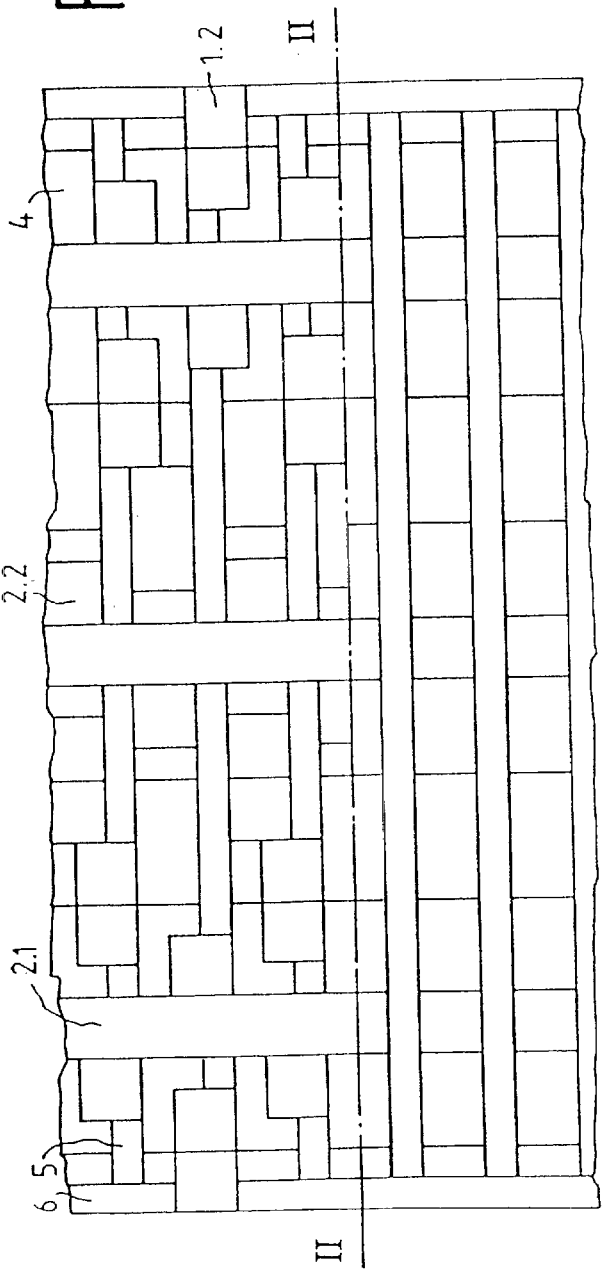

MULTI-PHASE TRANSVERSE FLUX MACHINE

BACKGROUND OF THE INVENTION

The invention relates to a transverse flux machine comprising a stator with essentially U-shaped and I-shaped cores of a soft-magnetic material and respectively one stator winding for each phase that generates a magnetic flux in these cores, as well as a rotor with a circular magnetic return path, and wherein the stator phases are magnetically separated.

A machine of this type is described in German Patent 196 14 862 A1. The machine consists of a stationary stator and a rotating rotor with permanent magnets, which are mounted on circular soft-iron magnetic return paths. The machine has a multi-phase design, wherein each phase can be viewed as a single-phase machine. A multi-phase arrangement can be obtained by stringing together several phases, wherein each phase is nevertheless insulated magnetically and electrically from the other phases. Transverse flux machines of this type, however, are very expensive to produce because of the permanent magnets and have a relatively low output factor.

It is the object of the present invention to create a multi-phase transverse flux machine, comprising a stator with essentially U-shaped and I-shaped cores of a soft-magnetic material and respectively one stator coil for each phase that generates a magnetic flux in these cores, as well as a rotor with circular magnetic return path, wherein the phases of the stator are magnetically separated. The machine should be cheap to produce and should have a relatively high degree of efficiency.

SUMMARY OF THE INVENTION

The above object generally is achieved according to the invention by a multi-phase transverse flux machine, comprising a stator with essentially U-shaped and I-shaped cores of a soft-magnetic material and respectively one stator winding for each phase that generates a magnetic flux in these cores, as well as a rotor with a circular magnetic return path; and wherein: the stator phases are magnetically separated; the rotor in each of the phases contains electrically conductive material; and the electrically conductive material of at least two phases is arranged and is interconnected in the rotor, such that if an alternating current flows through the stator windings of these phases, a current that generates a starting torque for the rotor is induced in the electrically conductive material. Advantageous modifications of the transverse flux machine according to the invention likewise are disclosed.

A starting torque can be obtained even without the permanent magnets, owing to the fact that the rotor in each of the phases contains electrically conductive material and that the electrically conductive material of at least two phases is arranged and interconnected in the rotor in such a way that a current generating a starting torque for the rotor is induced in the electrically conductive material if an alternating current flows through the stator coils of these phases. With the known transverse flux machine, a starting torque cannot be generated without the permanent magnets because of the single-phase state of the separately effective phases. In contrast, the machine according to the invention operates in such a way that the individual phases are magnetically independent, but electrically cooperate inside the rotor to form a magnetic rotating field machine. The aforementioned machine therefore behaves like an asynchronous transverse flux machine. By using an electrically conductive material with low specific resistance, the electrical losses in the rotor are relatively low, so that a satisfactory degree of effectiveness can be achieved.

The starting torque can preferably be obtained in that the stator coils of the individual phases can be admitted with currents that are phase-displaced relative to each other. In place of this or even in addition to this, the electrically connected rotor poles of the individual phases and/or the stator poles that are assigned to the electrically connected rotor poles of the individual phases can be geometrically displaced relative to each other. Given m phases, for example, the phases advantageously can be offset by an m-th part of double pole pitch. In that case, the currents and voltages flowing through the phases should also be displaced relative to each other in time by the corresponding angle.

If the electrically conductive material contained in the rotor forms a rotor cage with two short-circuit rings on the front, this cage corresponds to the standard rotor armature of an asynchronous machine.

The machine can be connected to a slip ring in place of a short-circuit ring if the machine is provided with a wire rotor winding, by way of which electrical power can be supplied from the outside. In that case, the machine displays a similar operational behavior as a known asynchronous machine with slip ring rotor. If the slip rings are supplied with direct current, the resulting machine behaves in the manner of an electrically excited synchronous machine.

The machine can be designed as unilateral or even as bilateral transverse flux machine. That is to say, the stator is located either on one side of the rotor only or on both sides of the rotor.

The machine can furthermore be designed such that it has either a rotating rotor or a rotor moving in linear direction.

In the following, the invention is explained in further detail with the aid of the exemplary embodiments shown in the Figures.

BRIEF DESCRIPTION OF THE DRAWINGS

FIGS. 1a and 1b are a vertical and a horizontal section through a transverse flux motor consisting of three phases, in accordance with a first exemplary embodiment of the invention.

FIGS. 2a and 2b are a vertical and a horizontal section through a transverse flux motor consisting of three phases, in accordance with a second exemplary embodiment of the invention.

DESCRIPTION OF THE PREFERRED EMBODIMENTS

Figure 3A:
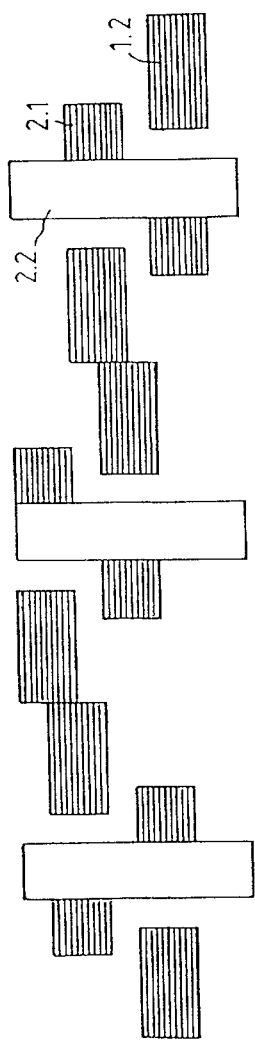
FIGS. 3a–3c are an example illustrating the sheet layering of the magnetic parts of the stator and the rotor.

FIG. 1 shows a linearly drawn arrangement of a transverse flux machine with three phases. The vertical section according to FIG. 1a is seen in movement direction, that is to say the rotor moves perpendicular to the drawing plane. The horizontal section in FIG. 1b extends in the direction tangential to the rotor movement. Above the line I—I in FIG. 1b, the view is from the stator outside onto the machine. Below the line I—I, the view is directly onto the plane of the air gap, as seen from the stator side.

The stator is designed to have three groups of U-shaped soft-magnetic cores 1, arranged respectively one after another in movement direction of the rotor, as well as I-shaped cores 2, which are respectively arranged in-between. Each of the three groups is assigned to one phase of the transverse flux motor. Each phase has a tangentially arranged stator coil 3, wherein currents that are electrically displaced relative to each other by 120° flow through the stator coils 3 for the three phases.

The rotor consists of six soft-magnetic circular return paths 4, which close the flow path for the soft-magnetic cores of the stator via the air gap between stator and rotor. In the process, the flux is conducted in tangential direction. The grooves formed in the magnetic return paths 4 each form respectively a phase of the machine on the same level. However, they are offset between the phases by 120° for the three-phase machine shown herein, as can be seen in FIG. 1b, below the line I—I. These grooves are filled with an electrically conductive material. Owing to a clever interconnection of the grooves for the individual phases and with the aid of short-circuit rings 6 on the front of the transverse flux machine, the electrically conductive material is connected in such a way that a three-phase systems is created through induction in the cage formed in this way. The result is an asynchronous machine with squirrel-cage rotor.

With the second exemplary embodiment according to FIG. 2, the stator poles are geometrically displaced relative to each other instead of the rotor poles that are displaced relative to each other, which clearly simplifies the design of the rotor cage. Illustration 2a in FIG. 2 also shows a vertical section through the transverse flux motor, as seen in movement direction of the rotor, while FIG. 2b shows a horizontal section. The region above line II—II represents a view from the stator outside onto the machine while FIG. 2b shows a view directly onto the plane of the air gap, as seen from the stator side. The rotor consist of the six grooved circular magnetic return paths 4 and a cage made of an electrically conductive material, namely rods 5 and short-circuit rings 6. In the stator, the poles and soft-magnetic cores 1 are displaced relative to each other in movement direction of the rotor. The upper cores that enclose the stator winding 3, of the phase assigned to a winding, are geometrically displaced relative to each other on the right and left side of the stator winding 3 by respectively one pole pitch. The phases furthermore contain a magnetic return path 2.1 that connects all upper cores, as well as the limbs 2.2 of a soft-magnetic material. The lower cores that do not enclose the stator winding 3 and are also geometrically displaced relative to each other by one pole pitch are arranged in tangential direction between the upper cores. They also consist of the joint magnetic return path 2.1 and the limbs 2.2.

With the second exemplary embodiment according to FIG. 2, the U-shaped cores 1 are realized with an offset in the stator. As a result, the individual phases can be lined up in axial direction right next to each other, which shortens the structural length. In order to reduce the leakage, the offset can be embodied such that the U-shaped or the I-shaped cores respectively cover only a portion of the magnetic return path of the rotor.

An optionally large displacement of the poles for rotor and/or stator relative to each other can be selected. However, the displacement can also be omitted altogether. It is only essential that a starting torque, as well as the highest possible torque during the operation, be obtained in cooperation with the currents flowing through the stator windings.

Figure 3B:
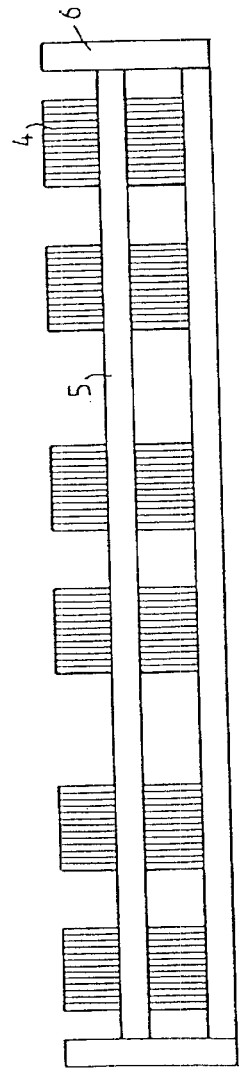
Figure 3C:
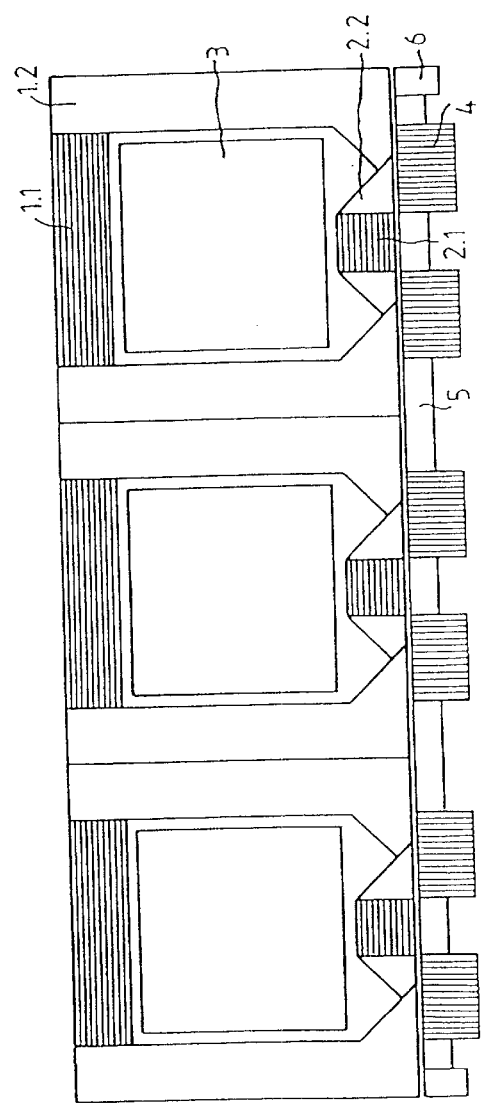

The soft-magnetic portion of the stator is preferably produced from electrical sheet, wherein at least the limbs of the U-shaped cores 1 and the I-shaped cores 2 are embodied as sheets layered tangentially to the rotor movement. With the exemplary embodiment according to FIG. 2, it is an advantage if the soft-magnetic portion of the stator is designed separate, as illustrated in FIG. 3. FIG. 3a shows the view from the air gap onto the stator side. FIG. 3b shows the view from the air gap onto the rotor side. FIG. 3c is a view in movement direction of the rotor. In the case of a rotating machine, sheets with the same width as the winding window are coiled such that they form a ring for the upper yoke 1.1 of the U-shaped core 1. A correspondingly thinner ring 2.1 is also required in the region of the I-shaped cores 2. The limbs of the upper and the lower cores consist of tangentially layered sheets. Sheets layered in axial direction are preferably used in the rotor for the magnetic return rods 4, wherein the layering can be achieved through a vertical rolling of the sheets, so as to save material.

What is claimed is:

1. A multi-phase transverse flux machine, comprising a stator with essentially U-shaped and I-shaped cores (1, 2) of a soft-magnetic material and respectively one stator winding (3) for each phase that generates a magnetic flux in these cores, and a rotor with a circular magnetic return path (4) and wherein: the stator phases are magnetically separated; the rotor in each of the phases contains electrically conductive material (5, 6); and the electrically conductive material (5, 6) of at least two phases is arranged and is interconnected in the rotor, such that if an alternating current flows through the stator windings (3) of these phases, a current that generates a starting torque for the rotor is induced in the electrically conductive material.

2. A transverse flux machine according to claim 1, wherein the stator windings (3) of the individual phases can be provided with currents, which are phase-displaced relative to each other.

3. A transverse flux machine according to claim 1, wherein the electrically connected rotor poles of the individual phases are geometrically displaced relative to each other.

4. A transverse flux machine according to claim 1, wherein the stator poles, which are assigned to the electrically connected rotor poles of the individual phases, are geometrically displaced relative to each other.

5. A transverse flux machine according to claim 1, wherein the electrically conductive material in the rotor forms a rotor cage (5) with two short-circuit rings (2) on the front.

6. A transverse flux machine according to claim 1, with a unilateral stator relative to the rotor.

7. A transverse flux machine according to claim 1, with a bilateral stator relative to the rotor.

8. A transverse flux machine according to claim 1, wherein the electrically conductive material (5, 6) of the rotor is connected to a slip ring for supplying electrical power from the outside.

9. A transverse flux machine according to claim 1, wherein the rotor performs a rotating movement.

10. A transverse flux machine according to claim 1, wherein the rotor performs a linear movement.

11. A transverse flux machine according to claim 1, wherein the soft-magnetic cores (1,2) of the stator and the magnetic return path (4) of the rotor are composed of layered sheets.

* * * * *